July 5, 1960

T. L. ROBINSON 2,943,956

PRINTED ELECTRICAL CIRCUITS AND METHOD
OF MAKING THE SAME

Filed Dec. 18, 1952

Inventor
Thomas L. Robinson,
By Parker, Prochnow & Farmer,
Attorneys.

United States Patent Office 2,943,956

Patented July 5, 1960

2,943,956

PRINTED ELECTRICAL CIRCUITS AND METHOD OF MAKING THE SAME

Thomas L. Robinson, Buffalo, N.Y., assignor to Automated Circuits, Inc., North Tonawanda, N.Y.

Filed Dec. 18, 1952, Ser. No. 326,679

4 Claims. (Cl. 117—212)

This invention relates to printed electrical circuits such as have heretofore been commonly used in connection with electronic devices and the like.

One of the objects of this invention is to provide a method of making printed electrical circuits with a high degree of accuracy, resulting from making the resistor or conductor patterns well and clearly defined and of correct dimensions. Another object is to provide an improved method for forming eyelets in a base supporting a printed electrical circuit in which the eyelets are formed so that a wire conductor or metal terminal may readily be connected through the same to a circuit printed on one or both sides of the base. Still another object is to provide a method of making printed electrical circuits which includes the step of selectively applying an insulating cover or coating to certain parts of the circuit so that other parts may be plated without affecting those which are covered. A further object is to provide an improved printed electrical circuit in which a stronger and better conducting contact is formed between a resistor and a conductor.

Other objects and advantages will be apparent from the following description of one embodiment of the invention and the novel features will be particularly pointed out hereinafter in connection with the appended claims.

In the accompanying drawings, I have illustrated by way of example, my improvements applied to a base 15 which may be of any suitable material, size and shape. This base may, for example, be of a suitable paper or cardboard and of a rigid material, such for example as a plastic composition. The base need not be entirely of non-conducting material, since it may be of metal covered or coated with an insulating material on which the circuits may be printed, as has heretofore been done. The word "printed" is herein used to designate not only the application of materials to the base by a printing method, but also by painting, spraying or otherwise depositing or applying the material while in semi-liquid form to the base.

The material may be of any suitable type, such as has heretofore been commonly used in printed electrical circuits, which preferably includes a suitable solvent or vehicle which may be an organic or inorganic resinous binder, shellac, lacquer or paints, to which has been added carbon or graphite to produce resistors or conductors.

Figure 2:
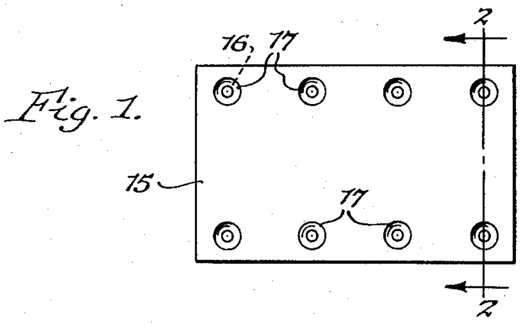
Fig. 2 is a section thereof, on line 2—2, Fig. 1.
Figure 1:
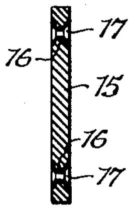
Fig. 1 is a face view of a base to which a printed electrical circuit is to be applied and having openings formed therein in which electrical conducting eyelets are positioned.
Figure 4:
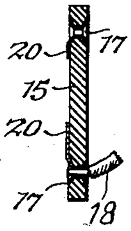
Fig. 4 is a transverse section thereof, on line 4—4, Fig. 3.

It is generally necessary that an electrical circuit printed on a base must have certain terminals by means of which the same can be connected to metallic conductor wires, and for this purpose, I preferably provide eyelets in the base at which certain conductors terminate. As clearly shown in Figs. 1 and 2, these eyelets are formed by originally providing holes 16 in the base which are countersunk at opposite ends thereof and a conducting paint is then applied to the holes and countersunk portions thereof. 17 represents the eyelets and after the composition forming the eyelets has been dried or cured and plated, wire or other metallic conductors 18 may be soldered in any usual or suitable manner in the eyelets, as shown in Fig. 4. By providing eyelets in this manner, the portions thereof in the counterbored parts of the base will be similar to flanges which will hold the eyelets securely in the holes.

Figure 3:
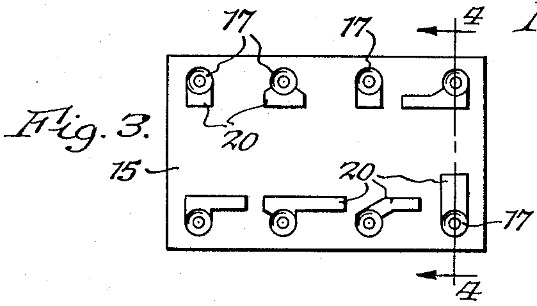
Fig. 3 is a face view of a base having portions of circuits connected with the eyelets printed thereon.
Figure 9:
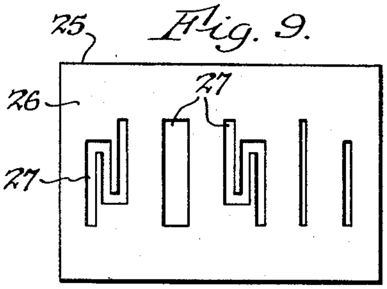
Fig. 9 is a face view of the die plate showing the depressions formed therein to produce the printed circuit shown in Fig. 7.
Figure 6:
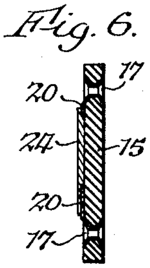
Fig. 6 is a transverse section thereof, on line 6—6, Fig. 5.
Figure 5:
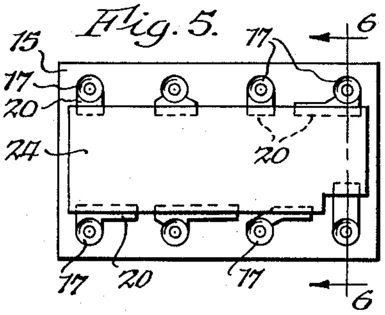
Fig. 5 is a face view of the base illustrated in Fig. 3 and 4 and having a coating of electricity conducting resistor material in semi-liquid form applied thereto.

In Figs. 3 and 4 I have shown various types of conductors 20 applied to a surface of the base by printing, and these printed conductors are arranged in such manner as to overlap or contact with portions of the eyelets 17 so that when a wire conductor or metal terminal is soldered in an eyelet, it will be in electrical connection with the conductor contacting with the eyelet.

Generally the proportions and sizes of low resistance conductors printed on a base is not very critical but if the conductors are to constitute resistors, it is generally quite necessary to have the material forming the resistors of correct thickness and width, since any increase in either thickness or width of the resistors will, of course, decrease their resistance, and similarly any decrease of width or thickness of the resistors will produce higher resistance.

In accordance with my process, I apply to the base a coating or layer 24 of resistance material in semi-liquid form. This layer is applied to the base in the desired thickness and the material is applied so as to overlap the various conductors 20 which have been already printed on the base. If a number of resistors are to be applied to a single base, the layer 24 is preferably of such dimensions that all of the resistors can be formed from this layer by removing the portions of the layer which are not required to form the resistors.

Figure 8:
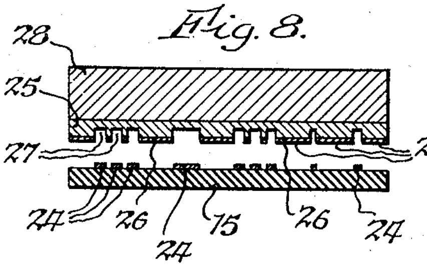
Fig. 8 shows in the lower part thereof a longitudinal sectional view of the base, on line 8—8, Fig. 7, and showing above this view similar sectional view of a die plate by means of which undesired portions of the coating are removed.
Figure 7:
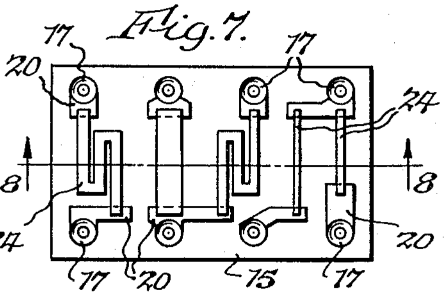
Fig. 7 is a face view of the base after the undesired portions of the coating applied thereto have been removed.

In order to produce resistors of the desired resistance, I provide a die plate or part of any suitable relatively hard material to which the resistor composition while in semi-liquid form will adhere and which in its simplest form for forming a single resistor, comprises a pair of surfaces formed to contact the base and spaced apart to form between them a space or recess of a width corresponding to the width of the resistor. In the construction shown by way of example, a die plate 25 is provided with a plurality of recesses 27 in the surface thereof which recesses may be of any suitable shapes corresponding to the shapes of the resistors desired. The die plate has surfaces 26 formed at opposite sides of the recesses to contact with the base to receive the paint or other material 24 which is not needed to form the resistors. The die plate is moved toward the base into contact with the resistance material 24 so that undesired portions of this resistance material will adhere to the unrecessed portions of this die plate. Consequently, some or all of the undesired material will attach itself to the paint receiving portions of the die plate, and when the die plate is raised out of contact with the base, the resistor material may be wiped from the face of the die plate. If the die plate does not on one application remove all of the undesired material from the base, the die plate may again be moved into contact with the base to cause further resistor material to adhere thereto and this material may then again be wiped from the die plate. Consequently, the die plate may be applied to the base as many times as necessary in order to completely remove all undesired material from the base. It will, of course, be understood that the die plate may be mounted on a part of the printing press or is otherwise accurately guided in its movement toward and from the base so as to be accurately positioned in correct relation to the base at each movement of the die plate toward the base. This die plate as shown by way of example in the drawings, is substantially flat but the die plate may be of cylindrical or other shape, depending upon the type of printing machine on which the die plate and base are to be used. Fig. 8 shows the die plate mounted on a part 28 of a printing press, and Fig. 8 also shows the die plate 25 after the same has been moved into operative relation to the base, thus showing undesired parts 29 of the paint or resistor material adhering to the die plate, which material is wiped from the die plate before the same is again used.

Figure 10:
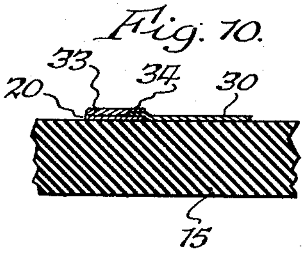
Fig. 10 is a section, on a greatly enlarged scale, of a portion of a printed circuit showing a part applied thereto by electroplating.

It is, of course, common practice in connection with the production of printed circuits to augment the circuits by electroplating so as to provide greater conductivity. I have found that I can reinforce printed circuits as well as increase the conductivity thereof by electroplating, without materially increasing the conductivity of the resistors. In Fig. 10 I have shown in cross section and on a greatly enlarged scale, the base 15 to which a conductor 20 has been applied by printing and also a resistor 30 as herein described. After the conductors and resistors have been applied to the base, I subject the base to electroplating in any usual or suitable manner, thus forming a deposit 33 on the conductor. When the plating current passes through the conductors and the eyelets, it does not pass through the resistors to a sufficient extent to produce any plating on the surfaces of the resistors, but some of the material electrolytically deposited on the conductors 20 will overlap the adjacent portions of the resistors 30 approximately to the extent to which the printed conductor 20 underlies the resistor 30, as indicated at 34. This overlapping forms with the original conductor 20 a groove into which the edge of the resistor extends. Consequently, the resistor is securely connected with the conductor 20 so that the resistor is held on the base 15 not only by its own adhesion thereto, but also by the adhesion of the conductor 20 to the base. By electroplating in this manner there are also secure and reliable electrical connections formed between the conductors and resistors.

If only certain parts of the conductors are to be plated, such conductors, and if desired, parts of resistors, may be coated with an insulating coating such as a lacquer, which may be selectively applied to those parts which are not to be plated. Furthermore, after the printed circuits have been dried or cured, the entire circuits may be covered with an insulating coating, such for example as a lacquer, which serves the purpose of causing even better adherence of the printed circuits to the base, as well as protecting the printed circuits from abrasion, impacts or the like and from short-circuiting.

By means of the method described, printed circuits are provided which can be quickly and efficiently produced in quantities and which can be formed with a high degree of accuracy. The conductors whether of high or low resistance can be in the form of very fine lines such as cannot be produced by merely printing the conductors on a base. When conducting material is applied to paper or other absorptive material, the solvent or vehicle of the conducting or resisting material sinks into the paper but the metallic particles, graphite or other body portion of the material lies on the surface and can be readily picked up, generally in one operation, by means of the contacting surfaces of the die plate or form. After the material has been applied to a base and the undesired material removed therefrom, the material remaining on the base may be dried or hardened in any usual or suitable manner as heretofore employed in connection with printed circuits.

It has been found by experience that much more accurate results can be obtained by first applying excessive conducting material to a base and then removing excess material by means of accurately positioned paint removing surfaces, than by applying the conducting material to the base by the usual printing method.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A method of making a printed electrical circuit, comprising applying to a non-conducting base a coating of a non-metallic electricity conducting material in semi-liquid form, and removing undesired portions of said coating by contacting the same with a surface, and removing from said surface the coating material adhering thereto to render said surface usable for further removal of coating material, to which said coating material adheres while said coating is in semi-liquid form, thereby leaving on said base accurately defined and located parts of said coating to form conductors, removing from said surface the coating adhering thereto, and repeating the contacting of said undesired portions of said coating with said surface, by guiding the movement of said surface into accurate contact with the same areas of said base which were originally contacted by said surface until all of said coating not required for conductors is removed from said base.

2. A method of making a printed electrical circuit comprising applying to a non-conducting base a coating of a non-metallic conducting material mixed with a resin and in semi-liquid form in excess of that required to produce the desired circuit, and completely removing undesired portions of said coating by contacting the same with a pair of surfaces to which said coating material adheres while the same is in semi-liquid form, said surfaces being spaced apart to leave on said base a body of said material of the desired width with spaces of said base at opposite sides of said body without any of said coating material thereon, and removing from said surfaces the coating material adhering thereto to render said surfaces usable for further removal of coating material.

3. A method of making a printed electrical high resistive circuit, comprising applying to a non-conducting base a coating of non-metallic electricity-conducting material in semi-liquid form, completely removing undesired portions of said coating by contacting the same with a hard surface to which said coating material adheres while said coating is in semi-liquid form when said hard surface is removed from said base, thereby leaving on said base accurately and sharply outlined and coated parts of said coating to form conductors and the spaces between said conductors which are entirely free of said coating to form insulation between said conductors, and removing from said surface the coating material adhering thereto to render said surface usable for further removal of coating material.

4. A method of making a printed electrical circuit, comprising applying to a non-conducting base a coating of an electricity-conducting material in semi-liquid form, forming on a die plate of hard material to which said coating material will adhere, depressions corresponding in shape to the portions of the coating to be left on said base, and moving said die plate in a direction substantially perpendicular to said base against the coating on said base to cause undesired portions of said coating to adhere to the undepressed portions of said die plate, and removing said die plate from said base to remove said undesired portions therefrom, and removing from said undepressed portions of said die plate the coating material adhering thereto to render said portions usable for further removal of coating material.

References Cited in the file of this patent

UNITED STATES PATENTS

| | | |
|---|---|---|
| 214,188 | Potter et al. | Apr. 8, 1879 |
| 304,440 | Meginn | Sept. 2, 1884 |
| 996,579 | Geisenhoner et al. | June 27, 1911 |
| 1,771,236 | Schellenger | July 22, 1930 |
| 2,179,566 | Stoekle | Nov. 13, 1939 |
| 2,270,166 | Hiensch et al. | Jan. 13, 1942 |
| 2,433,384 | McLarn | Dec. 30, 1947 |
| 2,474,988 | Sargrove | July 5, 1949 |
| 2,582,685 | Eisler | Jan. 15, 1952 |
| 2,599,710 | Hathaway | June 10, 1952 |
| 2,629,166 | Marsten et al. | Feb. 24, 1953 |
| 2,651,833 | Kernahan | Sept. 15, 1953 |
| 2,699,424 | Nieter | Jan. 11, 1955 |
| 2,699,425 | Nieter | Jan. 11, 1955 |

FOREIGN PATENTS

| | | |
|---|---|---|
| 602,492 | Great Britain | May 27, 1948 |

OTHER REFERENCES

N.B.S. Misc. Pub. 192 (1948), pages 17–42 (pages 17, 18 and 40).